Feb. 17, 1931.   G. E. DISNEY   1,792,825
SEALING DEVICE FOR TIRE VALVES
Filed Dec. 7, 1928
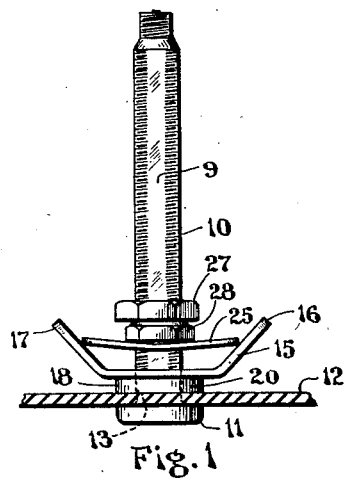
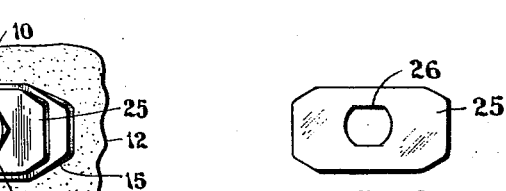
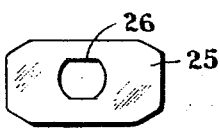
Inventor
George E. Disney
By
Attorney Patented Feb. 17, 1931

1,792,825

UNITED STATES PATENT OFFICE

GEORGE E. DISNEY, OF AKRON, OHIO, ASSIGNOR TO THE GOODYEAR TIRE & RUBBER COMPANY, OF AKRON, OHIO, A CORPORATION OF OHIO

SEALING DEVICE FOR TIRE VALVES

Application filed December 7, 1928. Serial No. 324,455.

This invention relates to inner tubes for pneumatic tires and it has particular relation to a valve stem associated with the tube for retaining air under pressure therein.

An object of the invention is to provide a sealing device between the inner tube of the tire and the valve stem for continually maintaining an air-tight connection between them.

Modern day transportation by motor vehicles, especially by those which carry passengers, requires the use of brake drums of large diameter in order to safeguard properly the lives of the passengers. The use of a large brake drum, however, results in the disposition of its outer peripheral surface closely adjacent the rim supporting the tire, and upon application of the brake heat generated by friction between the brake band and the brake drum is readily conducted to the rim. Tests have been indicated that the heat generated upon the drum frequently is as much as 500° F. and that the temperature of the tire rim is as much as 300° F. The latter temperature even exceeds the ordinary temperature required for vulcanization of the inner tube employed in the tire and hence causes a thinning of the wall thereof adjacent the rim. Since the valve stem is secured to the wall of the inner tube by a head on the former engaging the inner surface of the latter, and a bridge washer held by a lock nut against the outer surface of the tube, it is evident that thining of the tube causes a space between the clamped portion thereof and either the head of the valve stem or the bridge washer. Through this space the air in the tube frequently is discharged into the atmosphere.

This invention overcomes the difficulties heretofore enumerated by the provision of a resilient sealing device between the bridge washer and the locking nut on the valve stem. When any thinning of the inner tube occurs by reason of the heat generated on the brake drum of the wheel, the resilient device urges the bridge washer against the inner tube to compensate for any decrease in the space between the tube and either the head of the valve stem or the bridge plate.

For a better understanding of the invention, reference may now be had to the accompanying drawings, forming a part of the specification, of which:

Fig. 1 is an elevational view of a valve stem provided with a resilient sealing device constructed according to one embodiment of the invention;

Fig. 2 is a plan view of the valve stem shown by Fig. 1; and

Fig. 3 is a plan view of the resilient sealing device separated from the valve stem.

Referring to Fig. 1, a threaded valve stem 10 having diametrically opposed flattened portions, indicated at 9, projects through an opening 13 in an inner tube 12. The lower end of the valve stem is provided with an integral head 11 engaging the inner surface of the inner tube, whereas a bridge washer 18, slidably but non-rotatably mounted on the valve stem, engages the outer surface thereof. This washer is integral with a bridge plate 15 having obliquely and upwardly projecting ends 16 and 17. A metallic plate 25, slidably but non-rotatably mounted on the valve stem outwardly of the plate 15, is disposed between the oblique ends 16 and 17 of the plate 15 with its ends engaging intermediate inclined portions thereof. In order to retain the parts in their aforesaid position, lock nuts 27 and 28 are threaded on the valve stem outwardly of the metallic plate 25 with the nut 28 abutting the latter.

With the parts in their assembled positions as shown by Fig. 1 the central portion of the metallic plate 25 may be forced downwardly by the nuts 27 and 28, but its ends are prevented from moving downwardly because of their engagement with the ends 16 and 17 of the bridge plate 15. Consequently, a potential force is stored in the plate 25 which is exerted through its ends downwardly against the ends 16 and 17 of the bridge plate. In the event the inner tube becomes sufficiently heated, owing to the transmission of heat from the brake drum of the wheel to the rim supporting the tire, to cause thinning of that part of the tube adjacent the valve stem, it is evident that the potential force present in the plate 25 will cause a movement of the bridge plate downwardly to compensate for the thinning of the tube thus resulting in a tight seal between the valve stem and the tube.

From the foregoing description, it is apparent that a device has been provided which insures an air-tight seal between the inner tube of the tire and the valve stem associated therewith, regardless of any thinning of the tube owing to heat conducted thereto. While the form of the invention illustrated embodies a metallic plate, it is evident that a spring, a lock washer or similar device may be employed for performing the same function.

Although I have illustrated only one form which the invention may assume and have described in detail only a single application thereof, it will be apparent to those skilled in the art that the invention is not so limited but that various modifications may be made therein without departing from the spirit of the invention or from the scope of the appended claims.

What I claim is:

1. The combination with a valve stem having a head on its lower end, a washer loosely mounted on the stem and adapted to retain a portion of an inner tube adjacent the head, and a nut for moving the washer, of a resilient device disposed between the washer and nut.

2. The combination with a valve stem having a head on its lower end, a washer loosely mounted on the stem and adapted to retain a portion of an inner tube adjacent the head, and a nut for moving the washer, of a resilient plate disposed between the washer and nut.

3. The combination with a valve stem having a head on one end, a bridge washer with outwardly directed ends, and an adjustable device for moving the bridge washer, of a resilient plate between the adjustable device and washer, and normally contacting with only the ends of the bridge washer.

4. The combination with a valve stem having a head at one end thereof, of a spreader mounted upon the stem, a nut mounted upon the valve stem beyond the spreader, and a member made of resilient sheet metal having an opening through which the valve stem extends and positioned between the said nut and the spreader.

5. The combination with an inner tube, of a valve stem projecting through the tube and having elements thereon on opposite sides of the tube for clamping the latter, and means including a resilient device for holding the elements in contact with the tube.

In witness whereof, I have hereunto signed my name.

Signed at Akron in the county of Summit and State of Ohio, U. S. A., this 6th day of December, 1928.

GEORGE E. DISNEY.